United States Patent [19]

Yamamoto

[11] Patent Number: 5,021,889
[45] Date of Patent: Jun. 4, 1991

[54] FACSIMILE APPARATUS

[75] Inventor: Kazuhito Yamamoto, Isehara, Japan

[73] Assignee: Ricoh Company, Ltd., Tokyo, Japan

[21] Appl. No.: 480,125

[22] Filed: Feb. 14, 1990

[30] Foreign Application Priority Data

Feb. 20, 1989 [JP] Japan .................................. 1-38434

[51] Int. Cl.$^5$ .............................................. H04N 7/00
[52] U.S. Cl. ...................................... 358/440; 379/100
[58] Field of Search ................ 358/440, 402; 379/100;
340/825.07, 825.21; 370/60, 92

[56] References Cited

U.S. PATENT DOCUMENTS

| 4,631,597 | 12/1986 | Ogawa . | |
|---|---|---|---|
| 4,811,111 | 3/1989 | Kurokawa | 358/257 |
| 4,870,503 | 9/1989 | Miura | 358/440 |

FOREIGN PATENT DOCUMENTS

| 0283295 | 9/1988 | European Pat. Off. . | |
|---|---|---|---|
| 3306706 | 9/1983 | Fed. Rep. of Germany . | |
| 3345657 | 6/1984 | Fed. Rep. of Germany . | |
| 53-5520 | 1/1978 | Japan | 358/440 |
| 5923219 | 3/1978 | Japan | 358/440 |
| 57-46569 | 3/1982 | Japan | 358/440 |
| 63-19952 | 1/1988 | Japan . | |

2157924 10/1985 United Kingdom .

Primary Examiner—Edward L. Coles, Sr.
Attorney, Agent, or Firm—Oblon, Spivak, McClelland, Maier & Neustadt

[57] ABSTRACT

A facsimile apparatus comprises a scanner for reading an image and producing an image information to be transmitted in response thereto, transmission system given with a destination code designating a destination terminal to which the image information is to be transmitted and sending the image information to the terminal designated by the destination code, the destination code including a country code identifying the country in which the destination terminal belongs, a memory for storing the terminal identification information in a plurality of different languages used in different countries in combination with corresponding country codes each indicating a country in which the language is used, and a controller for discriminating the country code given to the transmission system and reading out the terminal identification information stored in the memory in one of the languages in combination with the country code given to the transmission system, said controller adding the terminal identification information thus read out to the image information to be transmitted.

6 Claims, 3 Drawing Sheets

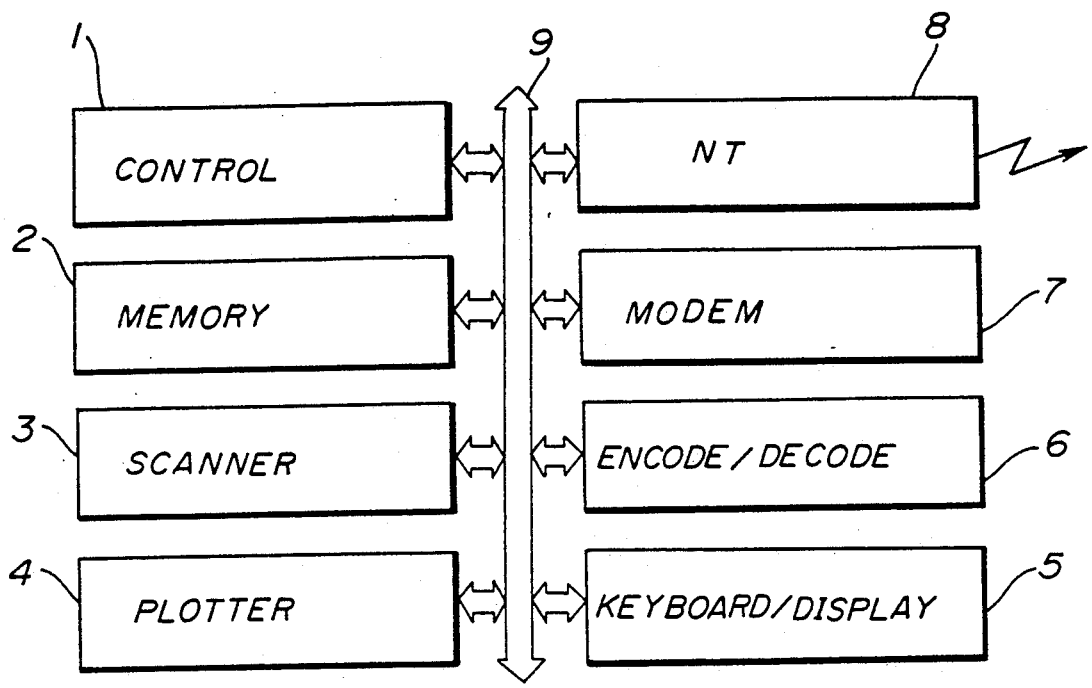

FACSIMILE APPARATUS
BACKGROUND OF THE INVENTION

The present invention generally relates to facsimile apparatus and particularly to a facsimile apparatus capable of sending information for identifying the terminal from which the facsimile transmission is made, to other terminals.

Generally, a facsimile apparatus has a capability of sending an information called a TTI information for identifying the terminal from which the facsimile transmission is made, to other terminals according to a pre-transmission procedure. By performing the pre-transmission procedure, the TTI information is added at the head of the page to be transmitted after conversion to an image information.

In the prior art facsimile apparatus having such a capability, however, there arises a problem in that, when an image information is transmitted to overseas such as United States from Japan for example, the TTI information, which is usually written in Japanese, is represented at the head of the reproduced document and thus, the operator at the receiving terminal cannot identify the terminal or party which has sent the facsimile transmission unless the operator can read the Japanese language.

Further, when the facsimile transmission is made to a wrong destination, there is a chance that the TTI information added to the facsimile transmission may be misused.

SUMMARY OF THE INVENTION

Accordingly, it is a general object of the present invention to provide a facsimile apparatus wherein the foregoing problems are eliminated.

Another and more specific object of the present invention is to provide a facsimile apparatus capable of sending the TTI information which is adapted, with respect to the language and the like used for representing the TTI information, to the country to which the facsimile transmission is to be made.

Another object of the present invention is to provide a facsimile apparatus in which sending of the TTI information is made only to restricted terminals which are registered in a memory.

According to the present invention, the TTI information is displayed in the language used in the country when the facsimile transmission is made to overseas. Further, as the terminals to which the TTI information is to be sent is restricted, undesirable transmission of the TTI information to wrong terminals is eliminated and thereby the risk that the TTI information is misused is substantially reduced.

Other objects and further features of the present invention will become apparent from the following detailed descriptions when read in conjunction with attached drawings.

BRIEF DESCRIPTION OF THE DRAWINGS

FIG. 1 is a block diagram showing the construction of facsimile apparatus according to an embodiment of the present invention;

FIG. 2 is a schematical view showing an example of a TTI table used in the facsimile apparatus of FIG. 1;

DETAILED DESCRIPTION

Figure 3:
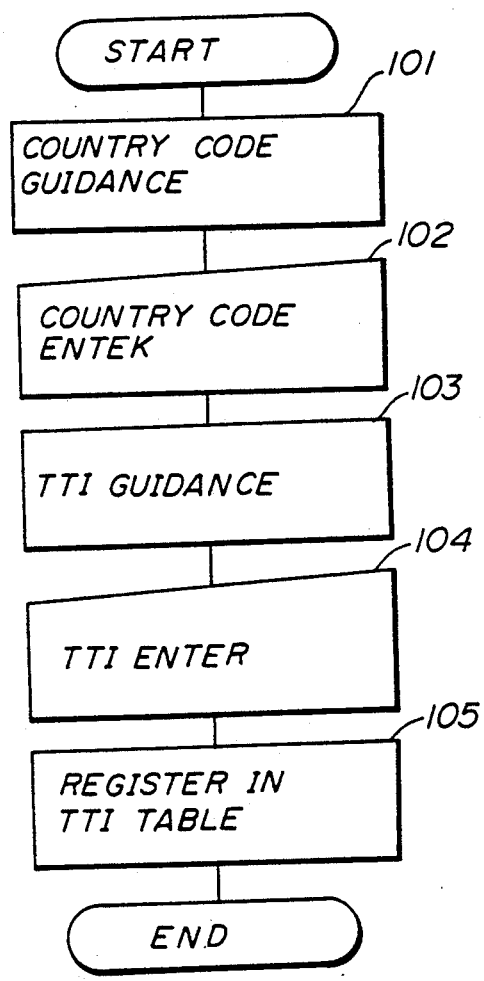
FIG. 3 is a flowchart showing a registration of data to the TTI, table.

FIG. 1 shows the construction of a facsimile apparatus according to an embodiment of the present invention.

Referring to FIG. 1, the facsimile apparatus comprises a controller 1 for controlling the operation of the facsimile apparatus and for performing a predetermined facsimile transmission control procedure. Further, there is provided a parameter memory 2 for storing various of informations including the TTI information pertinent to the facsimile apparatus or terminal. As will be described later, the TTI information is stored in a TTI table provided in the parameter memory 2 in a form adapted to the language used in various countries.

Further, the facsimile apparatus has a usual scanner 3 for reading images to be transmitted with a predetermined resolution, and a plotter 4 for recording the images with a predetermined resolution.

A keyboard/display unit 5 is provided for giving command to the facsimile apparatus and includes a keyboard and a display device which may be a liquid crystal display device. An encoder/decoder part 6 is provided for data compression of encoded image data and for recovering the original image by data decompression. A modem 7 is provided so as to modulate a carrier by the compressed image data to form an analog signal suitable for transmission via public telephone network which handles analog signals. Further, a network controller 8 is provided for connecting the facsimile apparatus to the telephone network. As usual, the network controller 8 is given a destination code designating the terminal to which a call is to be made and establishes a connection to the designated terminal under the control of the controller 1. The network controller 8 also performs automatic calling and answering.

The control part, parameter memory 2, scanner 3, plotter 4, keyboard/display unit 5, encoder/decoder part 6, modem 7 and the network controller 8 are interconnected via a system bus 9 which supports the exchange of data between the foregoing units.

FIG. 2 shows an example of a TTI table to be stored in the parameter memory 2. In the TTI table of the drawing, it is seen that the TTI informations written in various languages are arranged in correspondence to the country in which the language is used. More specifically, the TTI table lists the TTI information written in various languages in combination with a country code used in the telephone directory for designating the country such that the language representing the TTI information corresponds to the country in which the language is publicly used.

FIG. 3 shows an example to the procedure for registering the TTI information in the TTI table. Referring to FIG. 3, when an operator inputs a command designating the TTI input mode in a step 101, the controller 1 displays a message "ENTER COUNTRY CODE (COUNTRY NUMBER)" in the liquid display device of the keyboard/display unit 5. When the operator has entered the country code through the keyboard/display unit 5 in a step 102, the controller 1 stores the inputted country code and displays another message "ENTER TTI IN THE LANGUAGE PUBLICLY USED IN THE COUNTRY" in a step 103.

When the operator has entered the TTI information in a step 104 in the language used publicly in the country via the keyboard/display unit 5, the controller 1 stores the entered TTI information and combines the country code and the TTI information to form a register information which is newly registered in the parameter memory 2 in a step 105. Thus, the content of the TTI table entered by the operator is stored in the parameter memory 2 by the controller 1.

Figure 4:
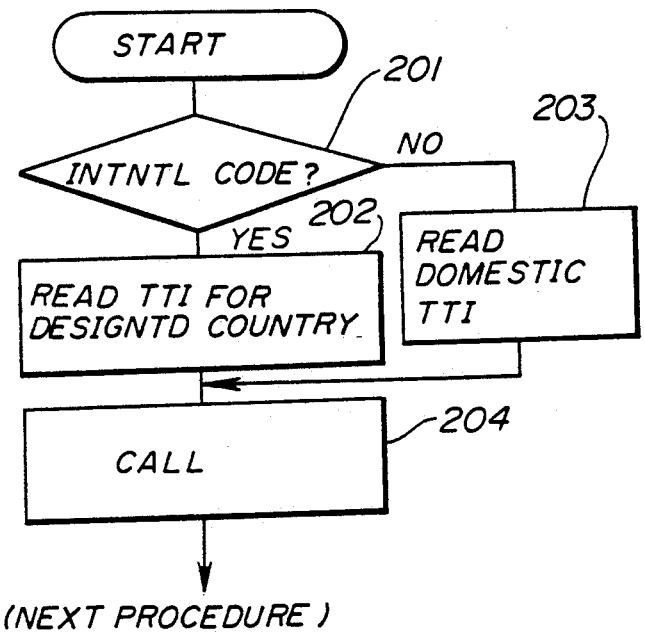
FIG. 4 is a flowchart showing a selection of TTI information upon transmission.

When sending a facsimile transmission in the facsimile apparatus of FIG. 1 in response to the command by the operator after completion of preparation of image information transmission including the input of destination terminal code or number, the controller 1 discriminates, in a step 201 of FIG. 4, whether the destination terminal code inputted by the operator is the international code or not. When the result of discrimination is YES, the country code included in the international code is extracted and the TTI information corresponding to the country code thus extracted is read out in a step 202. On the other hand, when the result of discrimination is NO, the TTI information written for domestic transmission is read out from the parameter memory 2 in a step 203.

Upon selection of the TTI information either in the step 202 or 203, the facsimile apparatus dispatches a call to the destination terminal designated by the command given by the operator, and performs a predetermined facsimile transmission procedure. At the same time, the information identifying the terminal from which the call is made is sent. When the TTI information is written in the language of the country to which the facsimile transmission is made and is combined with the country code in the TTI table as already described, the TTI information represented by the language used in the country to which the facsimile is to be sent is selected and added at the head of the page and the receiving party can identify the terminal from which the facsimile transmission is dispatched without difficulty even when the person at the receiving terminal cannot read the language used in the country from which the facsimile transmission is made.

Next, an embodiment will be described in which the destination terminals to which the TTI information is to be sent is restricted. In this case, the operator performs the procedure shown in FIG. 5 in advance of transmission and registers the destinations to which the TTI information is to be sent.

Figure 5:
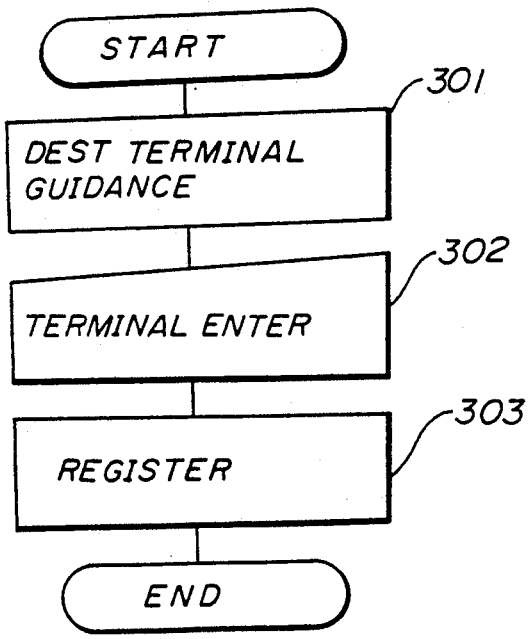
FIG. 5 is a flowchart showing a registration of restricted terminals to which the TTI information is to be sent.

Referring to FIG. 5, the operator gives a command in a step 301 indicating the registration of the destinations to which the TTI information is to be sent. In response to the command, the controller 1 returns a message "ENTER DESTINATION TO WHICH TTI INFORMATION IS TO BE SENT" and displays the message in the liquid crystal display of the keyboard/display unit 5.

In return, the operator enters the destination to which the TTI information is to be sent in a step 302 in a form of the destination terminal code or phone number. When the destination is thus entered, the controller 1 registers the destination in a step 303 in a TTI destination table which is provided in the parameter memory 2 and contains the list of destination terminals to which the TTI information is to be sent.

When the destinations to which the TTI information is to be sent are registered in the TTI destination table and when the predetermined preparation for facsimile transmission is completed including the inputting of terminal code number of the destination, the operator gives a command indicating the commencement of facsimile transmission.

Figure 6:
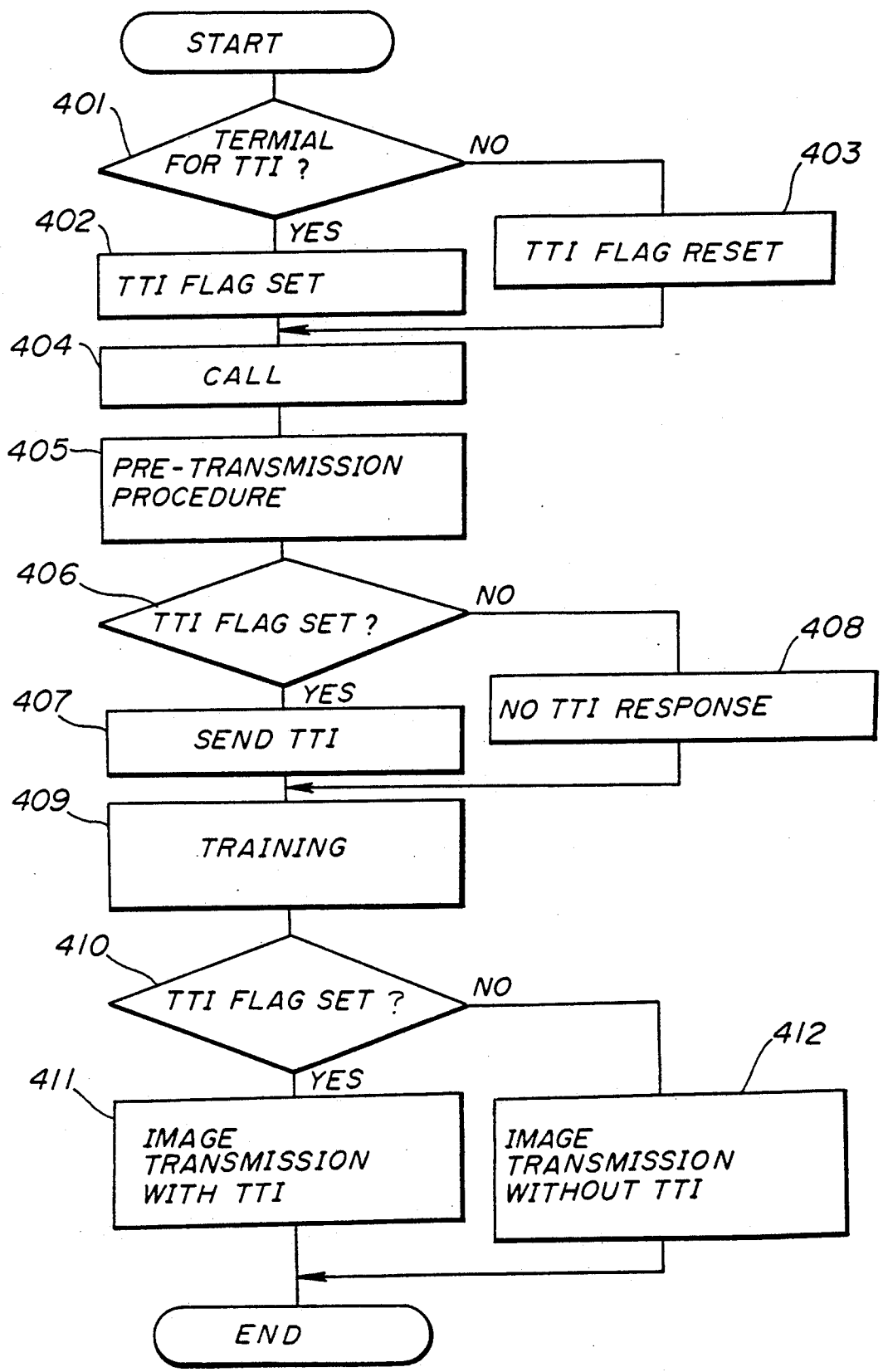
FIG. 6 is a flowchart showing an example of transmission in which the transmission is made to a terminal not listed in the TTI table which lists the restricted terminal to which the TTI information is to be sent.

Referring to FIG. 6, in response to the command given by the operator, the controller 1 performs a check whether the destination code number is registered in the TTI destination table or not in a step 401 of FIG. 6, and if YES, sets a TTI flag in a step 402. If the result is NO, on the other hand, the controller 1 resets the TTI flag in a step 403.

Next, a call is sent to the destination which has been entered previously in a step 404 and thereafter the predetermined pre-transmission procedure is carried out in a step 405.

In a step 406, a discrimination is made whether the TTI flag is set or not, and if YES, the TTI information is sent to the destination terminal during the pre-transmission procedure as shown in a step 407, while if NO, the transmission of the TTI information in the pre-transmission procedure is prohibited as shown in a step 408.

Next, a predetermined training of modem is made in a step 409 according to a modem speed which has been set in the pre-transmission procedure, and in response to the completion of modem training, another discrimination step 410 is performed for discriminating whether the TTI flag is set or not. When the result is YES, then an image transmission procedure is performed in a step 411 in which the TTI information is displayed at the head of each page of the transmitted image, while when the result is NO, the image transmission is made without adding the TTI information.

According to the construction of FIG. 6, the TTI information is sent only to the terminals which are listed or registered in the TTI table as a restricted terminal to which the TTI information is to be sent. Thus, even when the destination is erroneously designated, the TTI information is not sent unless the designated terminal is listed in the TTI table and the safety of transmission with regard to the secrecy of the dispatching terminal is maintained.

Further, the present invention is not limited to these embodiments but various variations and modifications may be made without departing from the scope of the invention.

What is claimed is:

1. A facsimile apparatus adapted for use in a terminal connected to an end of a network for sending a terminal identification information identifying the terminal in which the facsimile apparatus is operating, to another terminal connected to another end of the network together with an image information to be transmitted, comprising:

a scanner for reading an image and producing an image information to be transmitted in response thereto;

transmission means given with a destination code designating a destination terminal to which the image information is to be transmitted and sending the image information to the terminal designated by the destination code via the network, said destination code including a country code identifying the country in which the destination terminal belongs;

memory means for storing the terminal identification information in a plurality of different languages used in different countries in combination with corresponding country codes each indicating a country in which the language is used; and control means for discriminating the country code given to the transmission means and reading out the terminal identification information stored in the memory means in one of the languages in combination with the country code given to the transmission means, said control means adding the terminal identification information thus read out to the image information to be transmitted.

2. A facsimile apparatus as claimed in claim 1 in which said transmission means comprises a network controller physically connected to the network and supplied with the destination code for establishing a connection between the facsimile apparatus and the destination terminal via the network, a system bus connected to the network controller, said scanner is connected to the system bus and sends the image information to the system bus, an encoder connected to the system bus so as to be supplied with the image information from the scanner for producing a compressed image information, said encoder sending the compressed image information to the system bus, and a modem connected to the system bus for receiving the compressed image information from the encoder via the system bus, said modem producing an analog signal indicative of the compressed image information by modulating a carrier with the compressed image information supplied thereto and sending the analog signal to the network controller via the system bus for transmission, wherein the memory means and the controller are connected to the system bus and the control means reads out the terminal identification information from the memory means to the system bus.

3. A facsimile apparatus as claimed in claim 1 in which an input unit is connected to the system bus for entering the terminal identification information to the memory means in combination with the country code via the system bus.

4. A facsimile apparatus as claimed in claim 1 in which said control means discriminates whether the destination code includes a country code indicating a foreign country or only a domestic code, and in response to the result of discrimination, reads out the terminal identification information written in the language used in the own country from the memory means when the destination code includes only the domestic code while reads out the terminal identification information written in the language used in the country designated by the country code from the memory means when the destination code includes the country code.

5. A facsimile apparatus as claimed in claim 1 in which the control means controls the transmission of the terminal identification information to the destination terminal in a pre-transmission procedure preceding the the image transmission on the basis of the discrimination such that the terminal identification information is transmitted when the destination code given to the transmission means designates a terminal of which terminal code is stored in the memory means and such that the transmission of the terminal identification information is prohibited when the destination code given to the transmission means designates a terminal of which terminal code is not stored in the memory means.

6. A facsimile apparatus used in a terminal connected to an end of a network for sending a terminal identification information identifying the terminal in which the facsimile apparatus is operating, to another terminal connected to another end of the network together with an image information to be transmitted, comprising:

a scanner for reading an image and producing an image information to be transmitted in response thereto;

transmission means given with a destination code designating a destination terminal to which the image information is to be transmitted and sending the image information to the terminal designated by the destination code via the network;

memory means for storing a destination terminal code identifying a terminal to which the terminal identification information is to be sent together with the image information;

inputting means for inputting the destination terminal information to the memory means; and control means for discriminating whether the destination code given to the transmission means designates a terminal of which terminal code is stored in the memory means or a terminal of which terminal code is not stored in the memory means, and for adding the terminal identification information to the image information to be transmitted only when the terminal code of the destination terminal is stored in the memory means.

* * * * *